(12) United States Patent
Luo et al.

(10) Patent No.: US 11,161,190 B2
(45) Date of Patent: Nov. 2, 2021

(54) ELECTRODE FOR ELECTROEROSION MACHINING SYSTEM

(71) Applicant: General Electric Company, Schenectady, NY (US)

(72) Inventors: Yuanfeng Luo, Rexford, NY (US); Steven Robert Hayashi, Schenectady, NY (US); Andrew Lee Trimmer, Latham, NY (US); Dale Robert Lombardo, Clifton Park, NY (US); John Anthony Vogel, Charlton, NY (US)

(73) Assignee: General Electric Company, Schenectady, NY (US)

( * ) Notice: Subject to any disclaimer, the term of this patent is extended or adjusted under 35 U.S.C. 154(b) by 210 days.

(21) Appl. No.: 14/723,712

(22) Filed: May 28, 2015

(65) Prior Publication Data

US 2016/0346856 A1 Dec. 1, 2016

(51) Int. Cl.
*B23H 7/26* (2006.01)
*B23H 11/00* (2006.01)
(Continued)

(52) U.S. Cl.
CPC ............ *B23H 7/26* (2013.01); *B23H 3/02* (2013.01); *B23H 3/04* (2013.01); *B23H 3/06* (2013.01);
(Continued)

(58) Field of Classification Search
CPC .... B23H 3/04; B23H 3/06; B23H 9/14; C25F 7/00
See application file for complete search history.

(56) References Cited

U.S. PATENT DOCUMENTS 3,243,365 A * 3/1966 Aikin .................. B23H 9/14
204/290.01
3,340,166 A 9/1967 Trager
(Continued)

FOREIGN PATENT DOCUMENTS

CN 102896383 A 1/2013
CN 102896383 A 1/2013
(Continued)

OTHER PUBLICATIONS

Walker, Scott,Trimmer, Andrew (Oct. 2013)'The Blue Arc Machining Process' Paper Presented on Titanium USA 2013 Conference Proceedings. Titanium USA 2013, Caesars Palace, Las Vegas, Nevada, USA (Year: 2013).*

(Continued)

*Primary Examiner* — Louis J Rufo
(74) *Attorney, Agent, or Firm* — Fitch, Even, Tabin & Flannery, LLP (57) ABSTRACT

An electroerosion machining system for trepanning and drilling operations is disclosed. The electroerosion machining system includes an electrode assembly configured to machine a desired configuration in a workpiece, a power supply configured to energize the electrode assembly and the workpiece to opposite electrical polarities, an electrolyte supply configured to pass an electrolyte between the electrode assembly and the workpiece, a working apparatus configured to move the electrode assembly relative to the workpiece, and a control system to control the power supply and the working apparatus. The electrode assembly further includes an electrode body in the form of a tube-shaped body, the tube-shaped body defining a hollow interior and one or more replaceable inserts affixed to the electrode body at a working end thereof positioned adjacent the workpiece, the one or more replaceable inserts constructed so as to be (Continued)

selectively attachable and detachable from the working end of the electrode body.

20 Claims, 3 Drawing Sheets

(51) Int. Cl.
  *B23H 3/04* (2006.01)
  *B23H 9/14* (2006.01)
  *B23H 3/02* (2006.01)
  *B23H 3/06* (2006.01)
  *B23H 3/08* (2006.01)
(52) U.S. Cl.
  CPC ............... *B23H 3/08* (2013.01); *B23H 9/14* (2013.01); *B23H 11/00* (2013.01)

(56) References Cited

U.S. PATENT DOCUMENTS

| | | | |
|---|---|---|---|
| 4,213,834 A | 7/1980 | Semashko et al. | |
| 4,302,657 A | 11/1981 | Turelli et al. | |
| 6,204,466 B1 | 3/2001 | Tabor | |
| 6,413,407 B1* | 7/2002 | Bruns | B23H 3/00 204/224 M |
| 6,858,125 B2 | 2/2005 | Wei et al. | |
| 7,824,526 B2 | 11/2010 | Yuan et al. | |
| 8,236,162 B2 | 11/2012 | Zhan et al. | |
| 8,471,167 B2 | 6/2013 | Luo et al. | |
| 2003/0019844 A1* | 1/2003 | Shih | B23H 9/14 219/69.2 |
| 2005/0127042 A1 | 6/2005 | Hastilow et al. | |
| 2005/0218089 A1 | 10/2005 | Wei et al. | |
| 2008/0142488 A1 | 6/2008 | Luo et al. | |
| 2010/0126877 A1* | 5/2010 | Luo | B23H 5/06 205/686 |
| 2010/0320078 A1 | 12/2010 | Yuan et al. | |
| 2012/0211357 A1 | 8/2012 | Trimmer et al. | |
| 2012/0285820 A1* | 11/2012 | Li | B23H 7/36 204/227 |

FOREIGN PATENT DOCUMENTS

| | | | |
|---|---|---|---|
| CN | 202684248 U | | 1/2013 |
| EP | 2489456 A1 | * | 8/2012 |
| EP | 2489456 A2 | | 8/2012 |
| FR | 1290734 A | | 4/1962 |
| FR | 2416080 A1 | | 8/1979 |
| GB | 2179959 A | | 3/1987 |
| JP | H0396129 U | | 10/1991 |
| JP | H0663231 U | | 9/1994 |
| JP | 2001/105239 A | | 4/2001 |
| JP | 2001/113417 A | | 4/2001 |
| JP | 2003254332 A | | 9/2003 |
| JP | 2007/000949 A | | 1/2007 |
| SU | 745635 A1 | | 7/1980 |
| WO | 2013119372 A1 | | 8/2013 |

OTHER PUBLICATIONS

European Search Report and Opinion issued in connection with corresponding EP Application No. 16171137.9 dated Oct. 17, 2006.
European Search Report and Opinion issued in connection with Related EP Application No. 16170612.2 dated Oct. 17, 2006.
Yuanfeng Luo et al., filed May 28, 2015, U.S. Appl. No. 14/723,987.
Machine Translation and First Office Action and Search issued in connection with corresponding CN Application No. 201610359281.9 dated Oct. 26, 2018.
Machine Translated Japanese Office Action Corresponding to Application No. 2016104790 dated Aug. 31, 2020.
Russian Search Report Corresponding to Application No. 2016120205 dated Sep. 5, 2019.
European Office Action Corresponding to Application No. 16171137 dated Apr. 21, 2020.
Marafona et al., "Black Layer characterization and electrode wear ratio in electrical discharge machining (EDM)", Journal of Materials Processing Technology, vol. 184, No. 1-3, Elsevier, NL, Feb. 7, 2007, pp. 27-31.

* cited by examiner

ELECTRODE FOR ELECTROEROSION MACHINING SYSTEM

BACKGROUND OF THE INVENTION

Embodiments of the invention relate generally to electroerosion machines and, more particularly, to a tube-shaped electrode for electroerosion machines.

Electroerosion machining is a machining method that is generally used for machining hard metals or those that would be impossible to machine with other techniques such as using lathes, drills, or the like. Electroerosion machining can thus be used in trepanning or drilling operations in extremely hard steels and other hard, electrically conductive metals such as titanium, hastelloy, kovar, inconel, carbide, or the like. Certain electroerosion machining techniques utilize electrical discharge and spark eroding to provide a rough machining method that aggressively removes material (e.g., at a rate 10× that of standard electrical discharge machining) by a series of rapidly recurring electric arcing discharges between an electrode (the cutting tool) and the workpiece, in the presence of an energetic electric field. The electroerosion cutting tool is guided along the desired path very close to the work but it does not touch the piece. Consecutive sparks produce a series of micro-craters on the workpiece and remove material along the cutting path by melting and vaporization. The workpiece forms the cathode and the tool, otherwise referred to as the electrode, forms the anode. The particles are washed away by the continuously flushing dielectric fluid.

The electrode for an electroerosion machine is generally manufactured from conductive materials such as graphite, brass, or copper. As noted above, a flow of dielectric fluid, such as a hydrocarbon oil, is pumped into the gap between the electrode and the workpiece to allow a path for the electrical discharge and to flush away debris from the arcing. A pulsating DC power supply is connected to supply the energy that provides the arcing between the electrode and the workpiece. The discharges travel through and ionize the dielectric fluid and sparks occur where the surfaces of the electrode and the workpiece are closest. The region in which the spark occurs is heated to such high temperatures that a small speck of the work surface is melted and removed from the workpiece, and is subsequently swept away by the flow of the dielectric fluid. This part of the workpiece is now below the average level of the workpiece surface so the next highest areas of the workpiece are removed next. These discharges occur hundreds or thousands of times per second so that gradually all of the area on the workpiece that is in communication with the electrode is eroded.

For the reasons mentioned above, electroerosion is useful in machining components for use in aeronautical and space applications. For example, electroerosion is used to machine cooling holes in super alloy components of gas turbine airfoils in circumstances where accessibility or hole shape complexity precludes the use of laser drilling, with such holes being formed via trepanning or drilling methods. Cooling holes are formed in the airfoil wall sections of nozzle guide vanes to enable cooling air fed, for example, from the engine compressor to pass from the hollow core of the nozzle guide vanes to form a thin film of cooling air over the airfoil surface, thereby protecting the airfoil from the effects of high temperature combustion gases.

However, one drawback to electromachining processes is that material recycling of the workpiece is difficult and expensive. That is, it is recognized that material recycling for expensive workpiece materials (e.g., titanium) is highly desirable; however, existing electroerosion techniques make recycling of the workpiece difficult as chips and shavings generated by electroerosion machining are difficult and expensive to recycle due to their small size and also due to oxidation thereof. Especially for electoerosion machining techniques utilized to provide a rough machining method that aggressively removes a large amount of material, material recycling is highly desirable based on the amount of material being machined.

Therefore, it is desirable to provide a means for recycling workpiece chips and shavings in electroerosion rough machining processes.

BRIEF DESCRIPTION OF THE INVENTION

In accordance with one aspect of the invention, an electroerosion machining system includes an electrode assembly configured to machine a desired configuration in a workpiece, a power supply configured to energize the electrode assembly and the workpiece to opposite electrical polarities, an electrolyte supply configured to pass an electrolyte between the electrode assembly and the workpiece, a working apparatus configured to move the electrode assembly relative to the workpiece, and a control system to control the power supply and the working apparatus. The electrode assembly further includes an electrode body in the form of a tube-shaped body, the tube-shaped body defining a hollow interior and one or more replaceable inserts affixed to the electrode body at a working end thereof positioned adjacent the workpiece, the one or more replaceable inserts constructed so as to be selectively attachable and detachable from the working end of the electrode body.

In accordance with another aspect of the invention, an electrode assembly for use in an electroerosion machining system includes a pipe-shaped electrode body defining a hollow interior, the pipe-shaped electrode body having a working end positionable adjacent a workpiece to be machined via an electroerosion machining process and one or more replaceable inserts affixed to the electrode body at the working end to provide a cutting surface, the one or more replaceable inserts constructed so as to be selectively attachable and detachable from the working end of the electrode body.

In accordance with yet another aspect of the invention, an electroerosion machining system includes an electrode assembly configured to machine a desired configuration in a workpiece, a power supply configured to energize the electrode assembly and the workpiece to opposite electrical polarities, and a working apparatus configured to move the electrode assembly relative to the workpiece. The electrode assembly further includes a pipe-shaped electrode body defining a hollow interior sized to accommodate a core of workpiece material therein resulting from one of a trepanning or hole drilling of the workpiece and one or more replaceable inserts affixed to the pipe-shaped electrode body at a working end thereof, with the one or more replaceable inserts constructed so as to be selectively attachable and detachable from the working end of the pipe-shaped electrode body.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Embodiments of the invention provide an electrode assembly for electroerosion machines that provides for the recovery of chunks of a workpiece that result from an electroerosion machining process. The electrode assembly includes a pipe-shaped electrode body that is capable of receiving a chunk of workpiece material therein and a replaceable insert that is utilized for removal of material from the workpiece.

Figure 1:
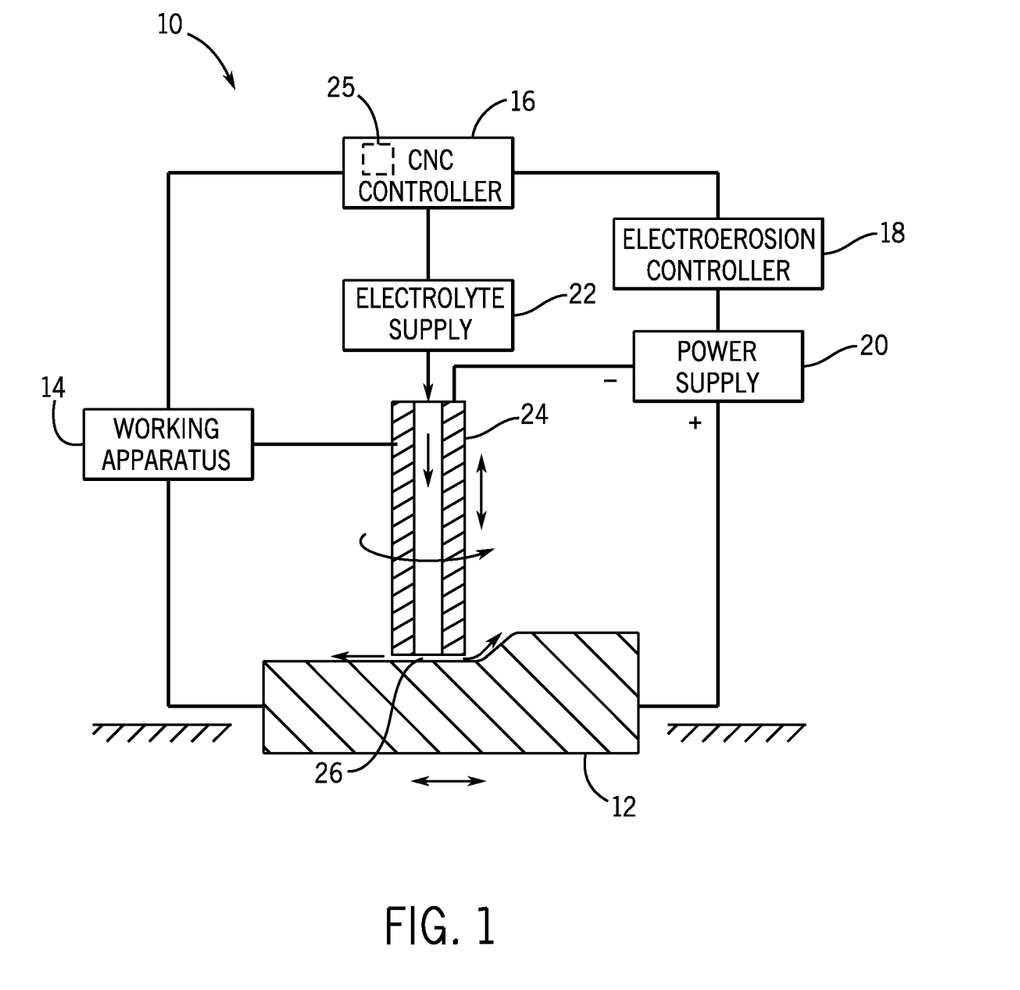
FIG. 1 is a schematic diagram of an electroerosion machining system according to an embodiment of the invention.

FIG. 1 illustrates a schematic diagram of an electroerosion machining system 10, such as a system for performing electrical discharge machining, in accordance with one embodiment of the invention. In an embodiment of the invention, the electroerosion machining system 10 is used to remove material from a workpiece 12 layer by layer to form a desired configuration. As illustrated in FIG. 1, the electroerosion machining system 10 comprises a numerical control (NC) or computer numerical control (CNC) device (not shown) including a working apparatus 14 and a CNC controller 16, an electroerosion controller 18, a power supply 20, an electrolyte supply 22, and an electrode assembly 24.

In embodiments of the invention, the NC or the CNC device can be used to perform traditional automated machining. In particular examples, the working apparatus 14 may comprise a machine tool or lathe including servomotors (not shown) and spindle motors (not shown), which are known to one skilled in the art. The electrode assembly 24 is mounted on the working apparatus 14 for performing electroerosion machining. Accordingly, the servomotors may drive the electrode assembly 24 and the workpiece 12 to move opposite to each other at a desired speed and path, and the spindle motors drive the electrode assembly 24 to rotate at a desired speed.

The CNC controller 16 comprises pre-programmed instructions based on descriptions of the workpiece 12 in a computer-aided design (CAD) and/or a computer-aided manufacturing (CAM), and is connected to the working apparatus 14 to control the working apparatus 14 to drive the electrode assembly 24 to move and/or rotate according to certain operational parameters, such as certain feedrates, axes positions, or spindle speeds, etc. In one non-limiting example, the CNC controller 16 may be a general CNC controller and comprise central processing units (CPU), read only memories (ROM), and/or random access memories (RAM), as known to one skilled in the art. Also, according to one embodiment, the CNC controller 16 may include a wear-calibrating program module 25 therein that functions to determine the condition of the electrode assembly 24 prior to or after machining, as will be described in greater detail below.

In the illustrated embodiment, the power supply 20 comprises a direct current (DC) pulse generator. The electrode assembly 24 and the workpiece 12 are connected to negative and positive poles of the power supply 20, respectively. Accordingly, in embodiments of the invention, the electrode assembly 24 may function as a cathode and the workpiece 12 may act as an anode. In other embodiments, the polarities on the electrode assembly 24 and the workpiece 12 may be reversed.

The electroerosion controller 18 is connected to the power supply 20 to monitor the status of the power supply 20. In one embodiment, the electroerosion controller 18 may comprise one or more sensors (not shown), such as a voltage and/or current measurement circuit for monitoring the status of voltages and/or currents in a gap 26 between the electrode assembly 24 and the workpiece 12. In other embodiments, the sensor(s) may be disposed in the power supply 20 or be disposed separately. In non-limiting examples, the electroerosion controller 18 may comprise a microprocessor or another computational device, a timing device, a voltage comparison device, and/or a data storage device etc. to be served as the sensor(s), as known to one skilled in the art. Additionally, the electroerosion controller 18 also communicates with the CNC controller 16 to control the power supply 20 and the movement of the working apparatus 14 holding the electrode assembly 24.

In one example, the electrolyte supply 22 may be in communication with and receive the pre-programmed instructions from the CNC controller 16 for passing an electrolyte between the electrode assembly 24 and the workpiece 12. Alternatively, the electrolyte supply 22 may be disposed separately. Thus, in electroerosion machining, the power supply 20 may pass a pulse electric current between the electrode assembly 24 and the workpiece 12 to remove material from the workpiece 12 layer by layer for forming a desired configuration while the electrolyte carries the removed material out of the gap 26.

Figure 2:
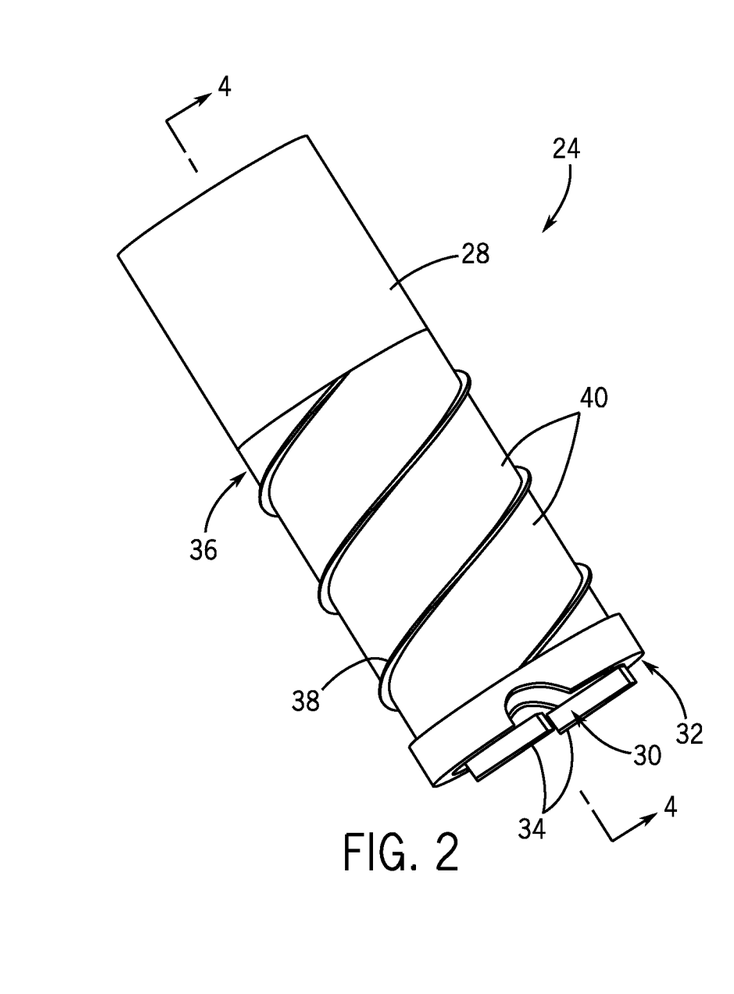
FIG. 2 is a perspective view of an electrode assembly of the electroerosion machining system of FIG. 1 according to an embodiment of the invention.
Figure 3:
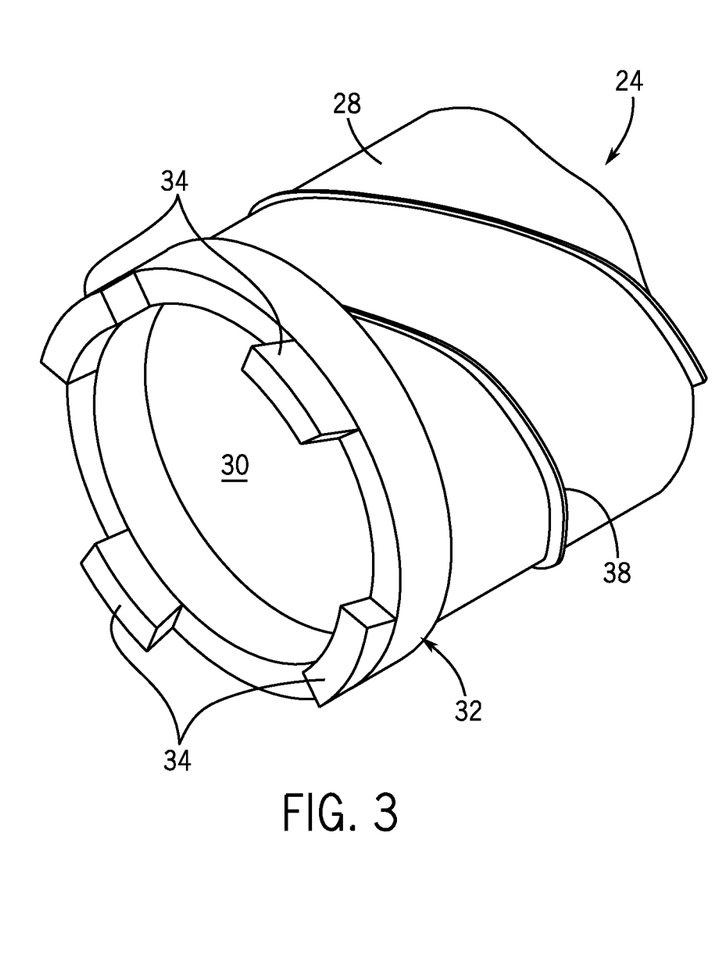
FIG. 3 is a perspective view of an electrode assembly of the electroerosion machining system of FIG. 1 according to an embodiment of the invention.

Referring now to FIGS. 2-5, the electrode assembly 24 is illustrated in greater detail according to exemplary embodiments. The electrode assembly 24 includes a tube or pipe-shaped electrode body 28 that defines a interior hollow portion 30. The electrode body 28 has a circular working face or end 32 positioned adjacent the workpiece 12, and one or more replaceable inserts 34 is affixed to the electrode body 28 at the working end 32 for performing the rough machining operation. In one embodiment, and as shown in FIG. 2, a single replaceable insert 34 is provided on the working end 32 of electrode body 28. However, in another embodiment, and as shown in FIG. 3, four replaceable inserts 34 are provided that are equidistantally spaced 90 degrees apart from one another about a perimeter of the pipe-shaped electrode body 28.

The replaceable insert(s) 34 are constructed of a material having suitable properties (e.g., electrical conductivity, wear resistance, etc.) for removing material from the workpiece 12. In an exemplary embodiment, the replaceable inserts 34 are formed of a tungsten copper alloy (WCu), although other suitable materials could also be used to form the inserts. It is recognized that the replaceable insert(s) 34 of the electrode assembly 24 wear down during operation, and thus the replaceable insert(s) 34 are constructed so as to be selectively attachable and detachable from the working end 32 of the electrode body 28. The attachment of the replaceable insert(s) 34 to the electrode body 28 may be achieved via bolting of the inserts to the body, for example, or via any other suitable means by which the replaceable insert(s) 34 may be selectively attached and detached from the electrode body 28.

As can be seen in FIGS. 2 and 3, dimensions of the hollow interior 30 are much larger than the thickness of the wall of pipe-shaped electrode body 28, such that the hollow interior 30 is configured to receive a chunk or core of workpiece material resulting from a trepanning or drilling of the workpiece 12. In addition to the core of workpiece material that enters into the hollow interior 30 of the electrode body 28, addition shavings or debris of workpiece material is forced outward and upward away from the electrode body 28 by electrolyte. As shown in FIG. 2, an outer surface 36 of the electrode body 28 includes a plurality of flutes 38 formed thereon that provide for removal of this workpiece debris away from the working end 32 of the electrode body 28. The flutes 38 are arranged in a spiral pattern on the outer surface 36 of the electrode body 28 so as to define flushing channels 40 through which electrolyte and workpiece debris are transferred away from the working end 32 of the electrode body 28.

Figure 4:
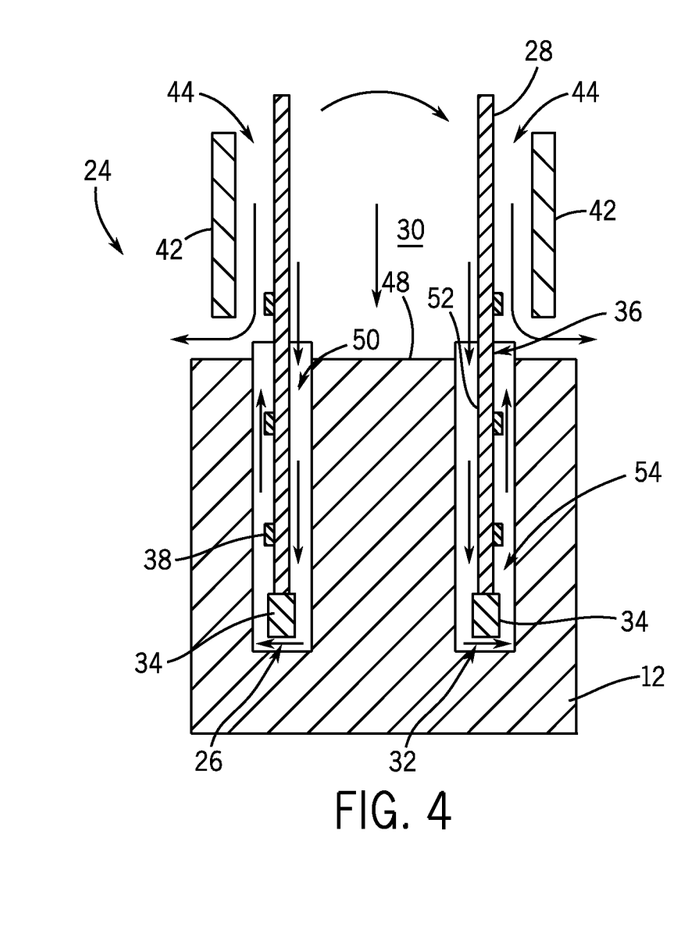
FIGS. 4 and 5 are cross-sectional views of the electrode assembly, taken along line 4-4, as the electrode assembly is advanced into the workpiece.
Figure 5:
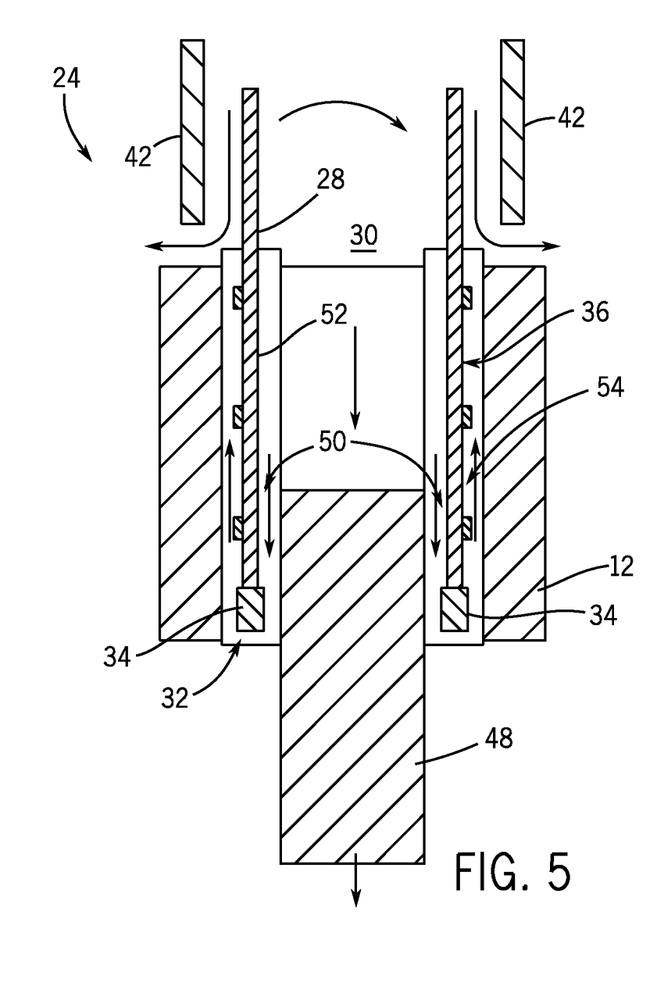

As best shown in FIGS. 4 and 5, the electrode assembly 24 also includes a shield member 42 that is used to direct a flow of protective gas toward the workpiece 12 in order to prevent oxidation of the chunk/core of workpiece material that is received within the hollow interior 30 of the electrode body 28. The shield member 42 is positioned about a portion of the electrode body 28 (i.e., it does not extend all the way down to working end 32) and is spaced apart from the electrode body 28 to define a gas channel 44 through which a protective gas may be provided. In one embodiment, argon gas is forced down through the gas channel 44 formed by the shield member 42 and electrode body 28 in order to provide a protective environment in which oxidation of the chunk/core of workpiece material will be prevented—such that the chunk/core may be recycled.

Referring now to FIGS. 4 and 5, a designated trepanning or drilling toolpath in which electrode assembly 24 may be moved is shown. In performing a trepanning or drilling operation along the toolpath, the electrode assembly 24 spins and is advanced into the workpiece 12 along a path controlled by the CNC controller 16 (FIG. 1). A working gap 26 is maintained between the circular working 32 and inserts 34 of the electrode assembly 24 and the receding corresponding surface of the workpiece 12. The corresponding surface of the workpiece 12 is continuously eroded away with or without electrical arcs. Thus an annular groove or hole 46 and a core 48 are gradually formed. An inner gap 50 is defined between the core 48 and an inner surface 52 of the electrode body 28, and an outer gap 54 is defined between the outer surface 36 of the electrode body and a sidewall of the annular groove or hole 46. In one embodiment, the inner gap 50 is in the form of slots or channels formed in the electrode body 28.

During the rough machining operation, the electrolyte supply 22 continuously pumps cool and clean cutting fluid under high pressure into the electrode assembly 24 through the inner gap 50 between the core 48 and the electrode assembly 24. The cutting fluid flows across the working gap 26 between the advancing working face 32 of the electrode assembly 24 and the receding corresponding surface of the workpiece 12 and then is forced to flow out through the outer gap 54 between the electrode assembly 24 and the workpiece 12 and out through flushing channels 40 in the outer surface 36 of the electrode body 28, thereby taking away the shavings and the heat generated during the rough machining operation.

As shown in FIG. 5, after completion of the trepanning or drilling operation, a core 48 is left that is completely separated from a remainder of the workpiece 12. The core 48 is contained within the hollow interior 30 of the electrode body 28 and may be removed therefrom upon completion of the electroerosion operation such that the core 48 may be recycled—with the core 48 being protected via the argon gas that is caused to flow through the gas channel 44 formed by the shield member 42 and electrode body 28. Such recycling of the workpiece material is especially beneficial when the workpiece material being machined is an expensive material, such as titanium for example.

It is recognized that the replaceable inserts 34 of the electrode assembly 28 experience wear during operation, and thus the condition of the replaceable inserts 34 must be monitored in order determine when it is necessary to replace the replaceable inserts 34. As indicated above, a wear-calibrating program module 25 (FIG. 1) may be utilized to monitor a condition of the electrode assembly 28—and specifically a condition of the replaceable inserts 34. The wear-calibrating program module 25 may monitor a size (e.g., thickness) of the replaceable inserts 34, such as by calculating a wear value between the thickness of the replaceable inserts 34 prior to machining the workpiece and the thickness of the replaceable inserts 34 after machining of the workpiece and determining a remaining life of the replaceable inserts 34. The replaceable inserts 34 may then be removed and replaced (e.g., old inserts 34 unbolted from the electrode body 28 and new inserts 34 bolted to the electrode body 28) upon a determination by the wear-calibrating program module 25 that new inserts are required.

Beneficially, embodiments of the invention thus provide an electrode assembly that enables the recycling of chunks of workpiece material from an electroerosion operation. The electrode assembly includes a pipe-shaped electrode body that is capable of receiving a core or chunk of workpiece material therein, with the core being removed therefrom upon completion of the electroerosion operation such that the core may be recycled. The electrode assembly is constructed to provide a flow of argon gas to the workpiece to provide protection to the core/chunk of workpiece material and prevent oxidation thereof along the cutting or working face of the electrode assembly. Replaceable inserts on the working face of the electrode assembly are provided such that the electrode body remains intact, with the replaceable inserts being easily attached and detached from the electrode body as required. Accordingly, an electrode assembly is provided having increased longevity (with only the replaceable inserts needing to be regularly replaced) and that reduces the costs of recycling workpiece material.

According to one embodiment of the invention, an electroerosion machining system includes an electrode assembly configured to machine a desired configuration in a workpiece, a power supply configured to energize the electrode assembly and the workpiece to opposite electrical polarities, an electrolyte supply configured to pass an electrolyte between the electrode assembly and the workpiece, a working apparatus configured to move the electrode assembly relative to the workpiece, and a control system to control the power supply and the working apparatus. The electrode assembly further includes an electrode body in the form of a tube-shaped body, the tube-shaped body defining a hollow interior and one or more replaceable inserts affixed to the electrode body at a working end thereof positioned adjacent the workpiece, the one or more replaceable inserts constructed so as to be selectively attachable and detachable from the working end of the electrode body.

According to another embodiment of the invention, an electrode assembly for use in an electroerosion machining system includes a pipe-shaped electrode body defining a hollow interior, the pipe-shaped electrode body having a working end positionable adjacent a workpiece to be machined via an electroerosion machining process and one or more replaceable inserts affixed to the electrode body at the working end to provide a cutting surface, the one or more replaceable inserts constructed so as to be selectively attachable and detachable from the working end of the electrode body.

According to yet another embodiment of the invention, an electroerosion machining system includes an electrode assembly configured to machine a desired configuration in a workpiece, a power supply configured to energize the electrode assembly and the workpiece to opposite electrical polarities, and a working apparatus configured to move the electrode assembly relative to the workpiece. The electrode assembly further includes a pipe-shaped electrode body defining a hollow interior sized to accommodate a core of workpiece material therein resulting from one of a trepanning or hole drilling of the workpiece and one or more replaceable inserts affixed to the pipe-shaped electrode body at a working end thereof, with the one or more replaceable inserts constructed so as to be selectively attachable and detachable from the working end of the pipe-shaped electrode body.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. An electroerosion machining system comprising:
   an electrode assembly configured to machine a desired configuration in a workpiece;
   a power supply configured to energize the electrode assembly and the workpiece to opposite electrical polarities;
   an electrolyte supply that supplies an electrolyte during machining of the workpiece;
   a working apparatus configured to move the electrode assembly relative to the workpiece; and
   a control system to control the power supply and the working apparatus;
   wherein the electrode assembly comprises:
      an electrode body in the form of a pipe shaped body, the electrode body having a length, a center defined by the length, an inner surface, an outer surface, a working end, and a rim surface that is perpendicular to the inner surface, the electrode body defining a hollow interior and an axial direction, the hollow interior of the electrode body being fluidly coupled to the electrolyte supply such that the electrolyte from the electrolyte supply may flow through the hollow interior and to the workpiece during machining thereof, wherein the rim surface is a surface of the electrode body that is at an extremity of the working end of the electrode body such that the rim surface is further away along the axial direction from the center of the electrode body than any other surface of the electrode body; and
      one or more replaceable inserts affixed to the electrode body at a working end thereof positioned adjacent to and facing the workpiece, a portion of the one or more replaceable inserts being positioned further away along the axial direction from the center of the electrode body than the rim surface, the one or more replaceable inserts constructed so as to be selectively attachable and detachable from the working end of the electrode body;
      wherein the electrode assembly further comprises a shield member positioned circumferentially around at least a portion of the electrode body, the shield member having an axial end that faces the workpiece, the shield member being spaced apart from the electrode body to define a cylinder-shaped gas channel through which a protective gas may be forced in the axial direction toward the workpiece, the axial end of the shield member being spaced apart from the workpiece to further define the gas channel between the axial end of the shield member and the workpiece, wherein the portion of the gas channel that is between the axial end of the shield member and the workpiece is configured to allow the protective gas to escape outwardly in a radial direction.

2. The electroerosion machining system of claim 1 wherein each of the one or more replaceable inserts is composed of a tungsten-copper alloy.

3. The electroerosion machining system of claim 1 wherein the one or more replaceable inserts comprises a plurality of replaceable inserts spaced equidistantally about a perimeter of the electrode body.

4. The electroerosion machining system of claim 3, wherein the electrode body comprises an outer surface having a plurality of flutes formed thereon, the plurality of flutes defining flushing channels configured to transfer workpiece debris away from the working end of the electrode body.

5. The electroerosion machining system of claim 1 wherein the electrode body comprises an outer surface having a plurality of flutes formed thereon, the plurality of flutes defining flushing channels configured to transfer workpiece debris away from the working end of the electrode body.

6. The electroerosion machining system of claim 5 wherein the plurality of flutes are arranged in a spiral pattern on the outer surface of the electrode body.

7. The electroerosion machining system of claim 6, wherein the inner surface of the electrode body defines an inner diameter and the outside surface of the electrode body defines an outer diameter, wherein a distance between the inner diameter and the outer diameter defines a wall thickness, wherein the inner diameter is larger than the wall thickness at all axial locations along the length of the electrode body such that the hollow interior of the electrode body is configured to receive a chunk of workpiece material resulting from a machining of the workpiece.

8. The electroerosion machining system of claim 1 wherein the gas channel directs the protective gas toward the working end of the electrode body, so as to prevent oxidation of workpiece debris.

9. The electroerosion machining system of claim 1 wherein the inner surface of the electrode body defines an inner diameter and the outside surface of the electrode body defines an outer diameter, wherein a distance between the inner diameter and the outer diameter defines a wall thickness, wherein the inner diameter is larger than the wall thickness at all axial locations along the length of the electrode body such that the hollow interior of the electrode body is configured to receive a chunk of workpiece material resulting from a machining of the workpiece.

10. The electroerosion machining system of claim 9 wherein the control system is configured to control the working apparatus so as to move the electrode assembly in order to perform a trepanning or hole drilling of the workpiece in order to generate the chunk of workpiece material.

11. The electroerosion machining system of claim 1 wherein the one or more replaceable inserts are positioned about an outer perimeter of the electrode body that defines an opening of the hollow interior at the working end.

12. The electroerosion machining system of claim 1, wherein the electrode body moves relative to the shield member when the electrode body is advanced into the workpiece.

13. An electrode assembly for use in an electroerosion machining system, the electrode assembly comprising:
 a cylindrical, pipe-shaped electrode body having, a length, a center defined by the length, an axial direction, an outer surface, an inner surface, and a rim surface that is perpendicular to the inner surface, the electrode body defining a hollow interior extending through at least a portion of the length of the electrode body, the pipe-shaped electrode body having a working end positionable adjacent to and facing a workpiece to be machined via an electroerosion machining process, the hollow interior sized to accommodate a core of workpiece material therein resulting from one of a trepanning or hole drilling of the workpiece, wherein the rim surface is a surface of the electrode body that is at an extremity of the working end of the electrode body such that the rim surface is further away along the axial direction from the center of the electrode body than any other surface of the electrode body; and
 one or more replaceable inserts affixed to the electrode body via attachment thereof to the working end to provide a cutting surface, a portion of the one or more replaceable inserts being positioned further away along the axial direction from the center of the electrode body than the rim surface, the one or more replaceable inserts constructed so as to be selectively attachable and detachable from the working end of the electrode body;
 wherein the electrode assembly further comprises a shield member positioned circumferentially around at least a portion of the electrode body, the shield member having an axial end that faces the workpiece, the shield member being spaced apart from the electrode body to define a cylinder-shaped gas channel through which a protective gas may be forced in an axial direction toward the workpiece, the axial end of the shield member being spaced apart from the workpiece to further define the gas channel between the axial end of the shield member and the workpiece, wherein the portion of the gas channel that is between the axial end of the shield member and the workpiece is configured to allow the protective gas to escape outwardly in a radial direction.

14. The electrode assembly of claim 13 wherein the pipe-shaped electrode body comprises an outer surface having a plurality of flutes formed thereon, the plurality of flutes defining flushing channels configured to transfer workpiece debris away from the working end of the pipe-shaped electrode body.

15. The electrode assembly of claim 14, wherein the inner surface of the electrode body defines an inner diameter and the outside surface of the electrode body defines an outer diameter, wherein a distance between the inner diameter and the outer diameter defines a wall thickness, wherein the inner diameter is larger than the wall thickness at all axial locations along the length of the electrode body such that the hollow interior of the electrode body is configured to receive a chunk of workpiece material resulting from a machining of the workpiece.

16. The electrode assembly of claim 13 wherein a distance between the inner surface and the outer surface defines a wall thickness, wherein an inner diameter defined by the inner surface is larger than the wall thickness at all axial locations along the length of the electrode body such that the hollow interior of the electrode body is configured to receive a chunk of workpiece material resulting from a machining of the workpiece, wherein each of the one or more replaceable inserts is composed of a tungsten-copper alloy.

17. The electrode assembly of claim 13 wherein the pipe-shaped electrode body comprises cooling channels formed therein by which the electrolyte travels from an electrolyte supply to the workpiece.

18. The electrode assembly of claim 17, wherein the pipe-shaped electrode body comprises cooling channels formed therein by which the electrolyte travels from the electrolyte supply to the workpiece.

19. The electrode assembly of claim 13 wherein the one or more replaceable inserts comprises four replaceable inserts spaced 90 degrees apart from one another about a perimeter of the pipe-shaped electrode body.

20. An electrode assembly for use in an electroerosion machining system, the electrode assembly comprising:
 a cylindrical, pipe-shaped electrode body having a length, an outer surface, and an inner surface, the electrode body defining a hollow interior extending through at least a portion of the length of the electrode body, the pipe-shaped electrode body having a working end positionable adjacent to a workpiece to be machined via an electroerosion machining process, the hollow interior sized to accommodate a core of workpiece material therein resulting from one of a trepanning or hole drilling of the workpiece; and
 one or more replaceable inserts affixed to the electrode body via attachment thereof to the working end to provide a cutting surface, the one or more replaceable inserts constructed so as to be selectively attachable and detachable from the working end of the electrode body;
 wherein the electrode assembly further comprises a shield member positioned circumferentially around at least a portion of the electrode body, the shield member having an axial end that faces the workpiece, the shield member being spaced apart from the electrode body to define a cylinder-shaped gas channel through which a protective gas may be forced in an axial direction toward the workpiece, the axial end of the shield member being spaced apart from the workpiece to further define the gas channel between the axial end of the shield member and the workpiece, wherein the portion of the gas channel that is between the axial end of the shield member and the workpiece is configured to allow the protective gas to escape outwardly in a radial direction;

wherein the electrode body moves relative to the shield member when the electrode body is advanced into the workpiece.

\* \* \* \* \*

UNITED STATES PATENT AND TRADEMARK OFFICE
CERTIFICATE OF CORRECTION

| | |
|---|---|
| PATENT NO. | : 11,161,190 B2 |
| APPLICATION NO. | : 14/723712 |
| DATED | : November 2, 2021 |
| INVENTOR(S) | : Yuanfeng Luo et al. |

It is certified that error appears in the above-identified patent and that said Letters Patent is hereby corrected as shown below:

In the Claims

Claim 3, Column 8, Line 47, delete "equidistantally" and insert -- equidistantly --.
Claim 13, Column 9, Line 43, delete "and facing a" and insert -- a --.

Signed and Sealed this
Twenty-third Day of August, 2022

*Katherine Kelly Vidal*

Katherine Kelly Vidal
*Director of the United States Patent and Trademark Office*